US008798817B2

(12) United States Patent
O'Dell et al.

(10) Patent No.: US 8,798,817 B2
(45) Date of Patent: Aug. 5, 2014

(54) METHODS AND SYSTEMS FOR REQUESTING AND RETRIEVING AIRCRAFT DATA DURING FLIGHT OF AN AIRCRAFT

(75) Inventors: Robert O'Dell, Rincon, GA (US); Jim Gallagher, Savannah, GA (US); Keith Conzachi, Pooler, GA (US); Noëlle Britt, Midway, GA (US); William Kerekesh, Richmond Hill, GA (US); Robert J. Geary, Rincon, GA (US)

(73) Assignee: Gulfstream Aerospace Corporation, Savannah, GA (US)

( * ) Notice: Subject to any disclaimer, the term of this patent is extended or adjusted under 35 U.S.C. 154(b) by 239 days.

(21) Appl. No.: 13/362,931

(22) Filed: Jan. 31, 2012

(65) Prior Publication Data

US 2013/0197725 A1 Aug. 1, 2013

(51) Int. Cl.
*G06F 7/70* (2006.01)
(52) U.S. Cl.
USPC ............... 701/14; 701/29.3; 701/3; 701/32.9; 701/2; 701/33.9; 701/36; 244/189; 244/190; 244/73 R; 340/438; 340/439; 340/459; 340/945
(58) Field of Classification Search
CPC ............................ B64F 5/0045; G08G 5/0013
USPC ......................................... 701/29, 31.5, 408
See application file for complete search history.

(56) References Cited

U.S. PATENT DOCUMENTS

| 6,092,008 | A * | 7/2000 | Bateman .......................... 701/14 |
| 2007/0088467 | A1* | 4/2007 | Knotts ............................. 701/14 |
| 2008/0228331 | A1* | 9/2008 | McNerney et al. ............... 701/3 |
| 2009/0134981 | A1* | 5/2009 | Shafaat et al. ................. 340/313 |
| 2010/0023201 | A1* | 1/2010 | Kinney et al. ..................... 701/33 |
| 2012/0101793 | A1* | 4/2012 | Cheriere et al. .................. 703/8 |
| 2012/0270531 | A1 | 10/2012 | Wright et al. |
| 2013/0197725 | A1* | 8/2013 | O'Dell et al. .................... 701/14 |

OTHER PUBLICATIONS

PCT Search Report and Written Opinion mailed Apr. 19, 2013 in PCT/US13/024025.

* cited by examiner

*Primary Examiner* — Redhwan k Mawari
(74) *Attorney, Agent, or Firm* — Ingrassia, Fisher & Lorenz, P.C.

(57) ABSTRACT

The disclosed embodiments relate to methods and systems for requesting and retrieving aircraft data during flight of an aircraft. This aircraft data can be used to perform additional monitoring of aircraft sub-systems to detect an abnormal condition, and/or to identify one or more sources that are causing the abnormal condition. In one embodiment, aircraft data for one or more relevant parameters can be requested from the ground, measured on-board the aircraft, and stored in a data file that is then communicated back to personnel on the ground. The real-time aircraft data for one or more relevant parameters can then be analyzed to identify the one or more sources that are causing the abnormal condition.

7 Claims, 8 Drawing Sheets

METHODS AND SYSTEMS FOR REQUESTING AND RETRIEVING AIRCRAFT DATA DURING FLIGHT OF AN AIRCRAFT

TECHNICAL FIELD

Embodiments of the present invention generally relate to aircraft, and more particularly relate to methods and systems for requesting and retrieving aircraft data during flight of an aircraft.

BACKGROUND OF THE INVENTION

When an aircraft is in flight, it can be difficult to detect when sub-systems or components of an aircraft begin to operate abnormally, and/or to correctly diagnose the specific source that is causing that sub-system or component to operate abnormally. While these abnormal operating conditions may persist after the aircraft has landed, in many cases they do not, which can make it even more difficult to correctly diagnose the specific source that is causing that sub-system or component to operate abnormally.

There is a need for methods and systems for monitoring the health of an aircraft and the aircraft's various components and sub-systems. It would be desirable to provide methods and systems that can automatically detect abnormal conditions that indicate when one or more sub-systems or components of an aircraft have experienced degradation in performance. It would also be desirable if such methods and systems can identify the specific source(s) within those particular sub-systems or components that are causing the degradation in performance so that corrective actions can be taken with respect to the identified sub-systems or components prior to fault indication or failure. It would also be desirable if such methods and systems execute automatically and do not require flight crew intervention. It would also be desirable to provide methods and systems that allow for ground personnel to request, collect and communicate aircraft data during flight of an aircraft. Other desirable features and characteristics of the present invention will become apparent from the subsequent detailed description and the appended claims, taken in conjunction with the accompanying drawings and the foregoing technical field and background.

SUMMARY

In one embodiment, a method is provided in which relevant parameters that are to be measured on-board the aircraft can be determined. A parameter request message is then generated that includes a parameter file that specifies the relevant parameters that are to be measured at the aircraft. The parameter request message is communicated to the aircraft over satellite communication links, and data for each relevant parameter is measured and recorded in a data file that is then communicated from the aircraft to the other computer that is coupled to the ground-based computer for further analysis In another embodiment, a system is provided. The system includes an aircraft, a satellite that is communicatively coupled to the aircraft and a gateway via satellite communication links, a ground support network comprising a ground-based computer, and another computer, coupled to the ground-based computer, that is configured to generate a parameter request message. The parameter request message includes a parameter file that specifies relevant parameters that are to be measured at the aircraft. The parameter request message can be communicated to the gateway for transmission to the aircraft over satellite communication links. The aircraft comprises an on-board computer, and a transceiver. The on-board computer is configured to measure data for each relevant parameter of the parameter file and to record the measured data in a data file. The transceiver is configured to transmit the data file to the satellite for delivery to the other computer.

DESCRIPTION OF THE DRAWINGS

Embodiments of the present invention will hereinafter be described in conjunction with the following drawing figures, wherein like numerals denote like elements.

DESCRIPTION OF EXEMPLARY EMBODIMENTS

As used herein, the word "exemplary" means "serving as an example, instance, or illustration." The following detailed description is merely exemplary in nature and is not intended to limit the invention or the application and uses of the invention. Any embodiment described herein as "exemplary" is not necessarily to be construed as preferred or advantageous over other embodiments. All of the embodiments described in this Detailed Description are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary or the following detailed description.

Figure 1:
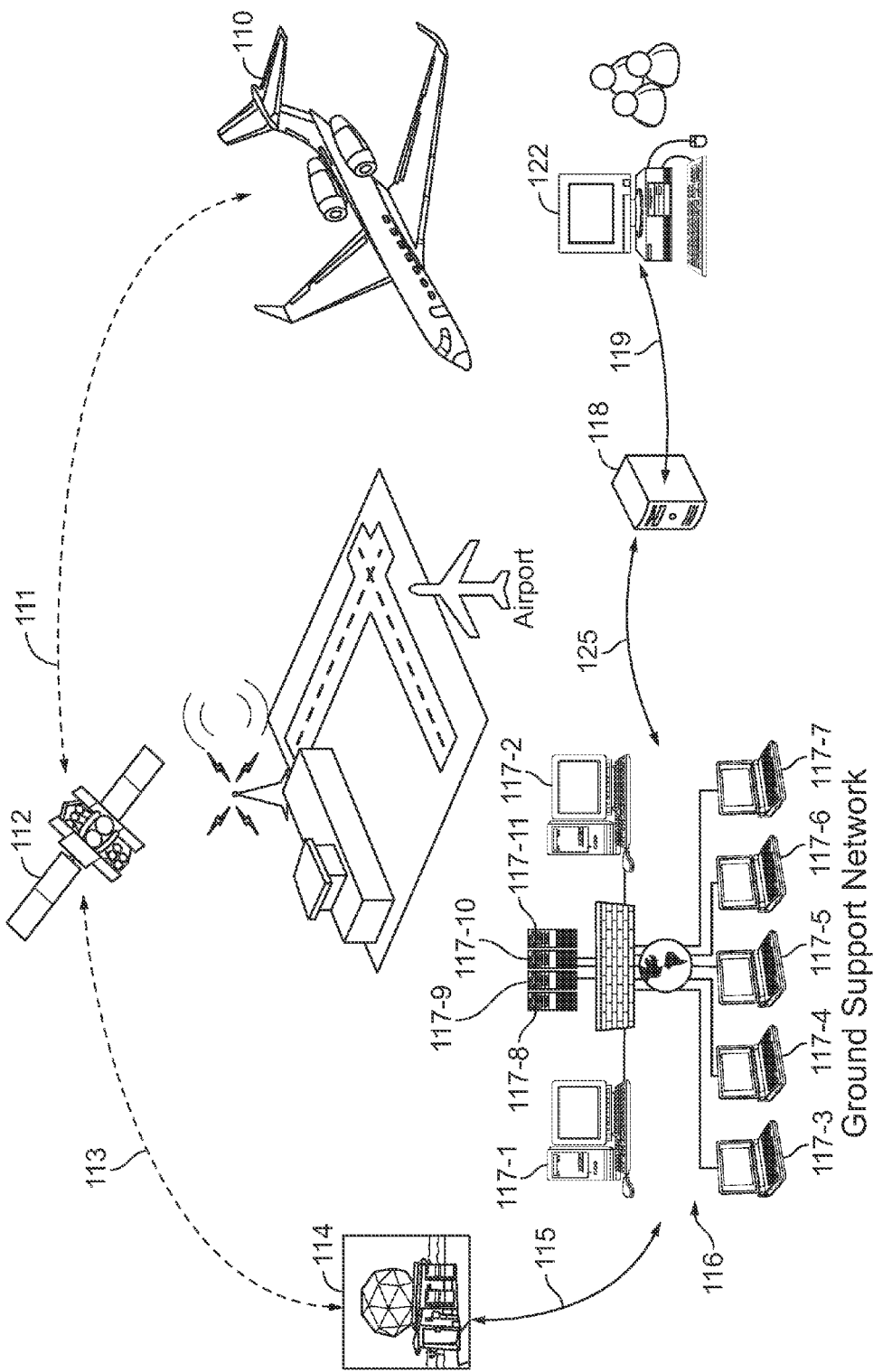
FIG. 1 illustrates an integrated system for aircraft health and trend monitoring of an aircraft and the aircraft's various sub-systems in accordance with some of the disclosed embodiments.

FIG. 1 is an integrated system 100 for health and trend monitoring of an aircraft 110 and the aircraft's various sub-systems in accordance with some of the disclosed embodiments. As used herein, the term "health monitoring" refers to the process of collecting and evaluating relevant parameters and/or measured data to determine the state, status, or numerical output value of a component and/or sub-system in any time period. As used herein, the term "trend monitoring" refers to the process of collecting and evaluating relevant parameters and/or measured data to determine the state, status, or numerical output value of a component and/or subsystem in any time period in order to predict, estimate, or trend, said state, status, or numerical output value of a component and/or sub-system at a future time.

The system 100 includes an aircraft 110, a satellite 112 that is communicatively coupled to the aircraft 110 and a gateway 114 via satellite communication links 111, 113, a ground support network 116 that includes at least one ground-based computer 117 (FIG. 1 illustrates an exemplary implementation with eleven computers 117-1 thorough 117-11), and another computer 122 that is coupled to the ground support network 116 via server 118. The computer 122 may be located, for example, at aircraft monitoring center of either an operator or the aircraft manufacturer.

While in flight, the aircraft 110 can transmit data over a satellite communication link 111. For example, in one embodiment, the data transmitted by the aircraft while in flight comprises a crew alerting system (CAS) message generated by the on-board computer (not shown in FIG. 1) of the aircraft. To explain further, many modern aircraft use Crew Alerting System (CAS) messages to provide engine and aircraft system fault information to the crew. CAS messages are annunciated to the crew based on triggers and logic embedded in an avionics suite. The logic typically receives inputs from all reporting aircraft systems and sub-systems. A CAS message is triggered when the combination of received inputs meets predetermined criteria of embedded logic. This could be Boolean or binary type inputs, or floating point parameters. Once the logic criteria have been satisfied, the avionics suite displays a message to the crew in either Red (warning), Amber (caution), or Cyan (advisory). Many CAS messages display failure or fault information to the crew. In these instances when failure or fault information is displayed, it is assumed that the system has experienced an anomaly and a corrective action must be performed to successfully extinguish the CAS message. The system records all of the CAS parameters at any given time. The CAS parameter value of the message has a zero value until the CAS message becomes active. Once active, the value of the CAS parameter value changes from zero to an integer between one (1) and sixty-three (63) depending on what failed. As the CAS messages are recorded, the system is detects when the value of the parameter changes from zero to a non-zero value.

The CAS message includes unprocessed data. The CAS message automatically indicates that measured data for a relevant parameter or variable of a sub-system of the aircraft is outside one or more threshold limits and that an abnormal condition has been detected. In accordance with some of the disclosed embodiments, when a CAS message is generated on-board the aircraft 110, data for parameters that are associated with that particular CAS message are automatically measured and stored in a file that is transmitted to the ground support network 116. Aircraft maintenance and engineering personnel can determine based on experience a number of different parameters that are the typical triggers for each particular CAS message. As such, for each particular CAS message, parameters and their respective thresholds (e.g., upper and/or lower thresholds for each parameter) can be pre-defined.

The aircraft on-board computer is configured to open a communication path that includes a first satellite communication link 111 between the aircraft 110 and the satellite 112 and a second satellite communication link 113 between the satellite 112 and the ground-based gateway 114. As such, the satellite 112 is communicatively coupled to the aircraft 110 and to the gateway 114 via satellite communication links 111, 113, respectively, and any servers between the aircraft 110 and the gateway 114. The on-board computer of the aircraft 110 can communicate the CAS message file over the first satellite communication link 111 to the satellite 112. The satellite 112 can then communicate the CAS message file over the second satellite communication link 113 to the gateway 114, and the gateway 114 can communicate the CAS message file to the ground support network 116 via communication link 115.

The ground support network 116 can be operated by a different party or entity from the party or entity operating the aircraft. The ground support network 116 includes several health management algorithms that are used to process data and data files received from the aircraft 110. Once the data from the aircraft 110 is processed using the appropriate health management algorithms, the ground support network 116 can generate web pages that are provided to the server 118. The web pages include information regarding aircraft health and/or fleet health. The web pages can include the processed data generated from unprocessed data communicated from the aircraft 110, data files from the aircraft 110, information derived from the processed data or data files, etc. The web pages can also include information that identifies elements of the aircraft, such as sub-systems (or components thereof), which need to be inspected.

In accordance with the disclosed embodiments, the ground support network 116 includes at least one ground-based computer 117 (eleven computers 117-1 . . . 117-11 are illustrated in the exemplary implementation of FIG. 1). In one exemplary, non-limiting embodiment, the ground-based computer 117 of the ground support network 116 is configured to process the unprocessed data from the CAS message file that was transmitted from the aircraft 110 to generate the processed data. For example, when the file corresponding to the CAS message is received and loaded at one of the ground-based computers 117 of the ground support network 116, the ground-based computer 117 may load and execute an appropriate Aircraft Health and Trend Monitoring (AHTM) program module (380 in FIG. 3) that corresponds to the particular CAS message indicated in the file. When the ground-based computer 117 executes a Health and Trend Monitoring Algorithm (HTMA), the measured data for each of the parameters that are included in the file can be analyzed to determine which of the parameters are at an abnormal level (i.e., outside of its upper and/or lower threshold limits), and thus most likely causing that particular CAS message to be generated. For example, in some embodiments, each of the parameters can be compared to one or more thresholds, and any parameters that are determined to be outside those threshold(s) can be identified as being a potential cause of the CAS message. When the measured data for any parameter is determined to be abnormal, the HTMA can flag the abnormality and the parameters that are outside of their respective threshold(s) can then be stored in as processed data in a processed data file. In some implementations, the processed data can also indicate particular sub-system(s) (or components thereof) that each of the parameters are associated with. This way, those particular sub-system(s) (or components thereof) can be identified and flagged for further inspection to determine whether they are operating correctly or whether corrective actions need to be taken.

The ground support network 116 is coupled to the server 118 via a communication link 125. The server 118 serves as a portal to the ground support network 116, and serves the web pages from the ground support network 116 to the computer 122 so that the web pages can be displayed. Among other information, the ground-based computer 117 can communicate the processed data (that was generated from the unprocessed data received from the aircraft 110) to the server 118 via these web pages.

The computer 122 is coupled to the ground support network 116 via a communication link 119 to the server 118. The computer 122 allows communication to the ground support network 116, for example from a system operator and/or another computer system, and can be implemented using any suitable method and apparatus. This way, the information generated at the ground support network 116 can be viewed by personnel or operator at the computer 122. The computer 122 can include one or more network interfaces to communicate to other systems or components, one or more terminal interfaces to communicate with technicians, and one or more interfaces to connect to the ground support network 116.

In accordance with the disclosed embodiments, the server 118 communicates the processed data to the other computer 122.

Although not illustrated in FIG. 1, the computer 122 includes a processor that can perform processing, either automatically or in response to input from an operator, to generate a parameter request message. In some scenarios, the processing can be performed based on or in response to processed data that was generated based on data received from the aircraft 110 while in flight.

The parameter request message includes a parameter file that specifies relevant parameters that have been selected to be measured and recorded at the aircraft 110 to provide the additional parametric data. In some embodiments, the parameter file also includes a duration value for each relevant parameter. Each duration value specifies how long parametric data for that particular relevant parameter are to be measured and recorded.

In accordance with one non-limiting, exemplary embodiment, the relevant parameters can be selected either automatically by software or by a human operator.

In one embodiment, the relevant parameters are determined based on analysis of the processed data either automatically by software or by a human operator that analyzes the processed data. Each of the relevant parameters can correspond to additional parametric data that is needed from the aircraft 110 to identify one or more sources that are causing an abnormal condition (e.g., that caused the CAS message to be generated). In some implementations, each relevant parameter can influence or affect data that is to be measured by the aircraft.

For example, in some embodiments, the relevant parameters can be determined using computer software that is implemented at a computer to automatically analyze the processed data to automatically determine relevant parameters that are to be measured at the aircraft to provide the additional data. By contrast, in some other embodiments, the relevant parameters can be determined by an operator on any basis, observation or information. For instance, in one implementation, the operator might, for example, view the processed data via a computer interface and manually identify and select relevant parameters at computer 122 based on the processed data.

Regardless of how the parameter request message is generated, the computer 122 communicates the parameter request message to the server 118, which communicates the parameter request message to the ground support network 116. The ground support network 116 then communicates the parameter request message to the gateway 114, which communicates the parameter request message to the satellite 112 via the second satellite communication link 113. The satellite 112 then communicates the parameter request message to the aircraft 110 via the first satellite communication link 111.

As discussed in more detail below, the aircraft 110 includes at least one an on-board computer and a transceiver and wireless communication network interface for communicating information over the satellite communication link 111. After receiving the parameter request message, the on-board computer is configured to extract the parameter file from the parameter request message at the on-board computer of the aircraft 110, to determine the relevant parameters (and optionally the corresponding duration values for each of the relevant parameters from the parameter file), and to measure parametric data for each relevant parameter for a corresponding duration value and to record the measured parametric data in a data file. In some implementations, the measured parametric data for each of the relevant parameters comprises a data stream of measured parametric data for that particular relevant parameter that is measured for a particular corresponding duration value.

The transceiver is configured to transmit the data file over the first satellite communication link 111 to the satellite 112 for delivery to the ground support network 116 and to the other computer 122.

In one embodiment, upon receiving the data file, the satellite 112 communicates the data file over the second satellite communication link 113 to the gateway 114, and the gateway 114 communicates the data file to the ground support network 116. The ground support network 116 can then communicate the data file to the server 118, which can communicate the data file to the computer 122 for display on a computer interface.

Figure 2A:
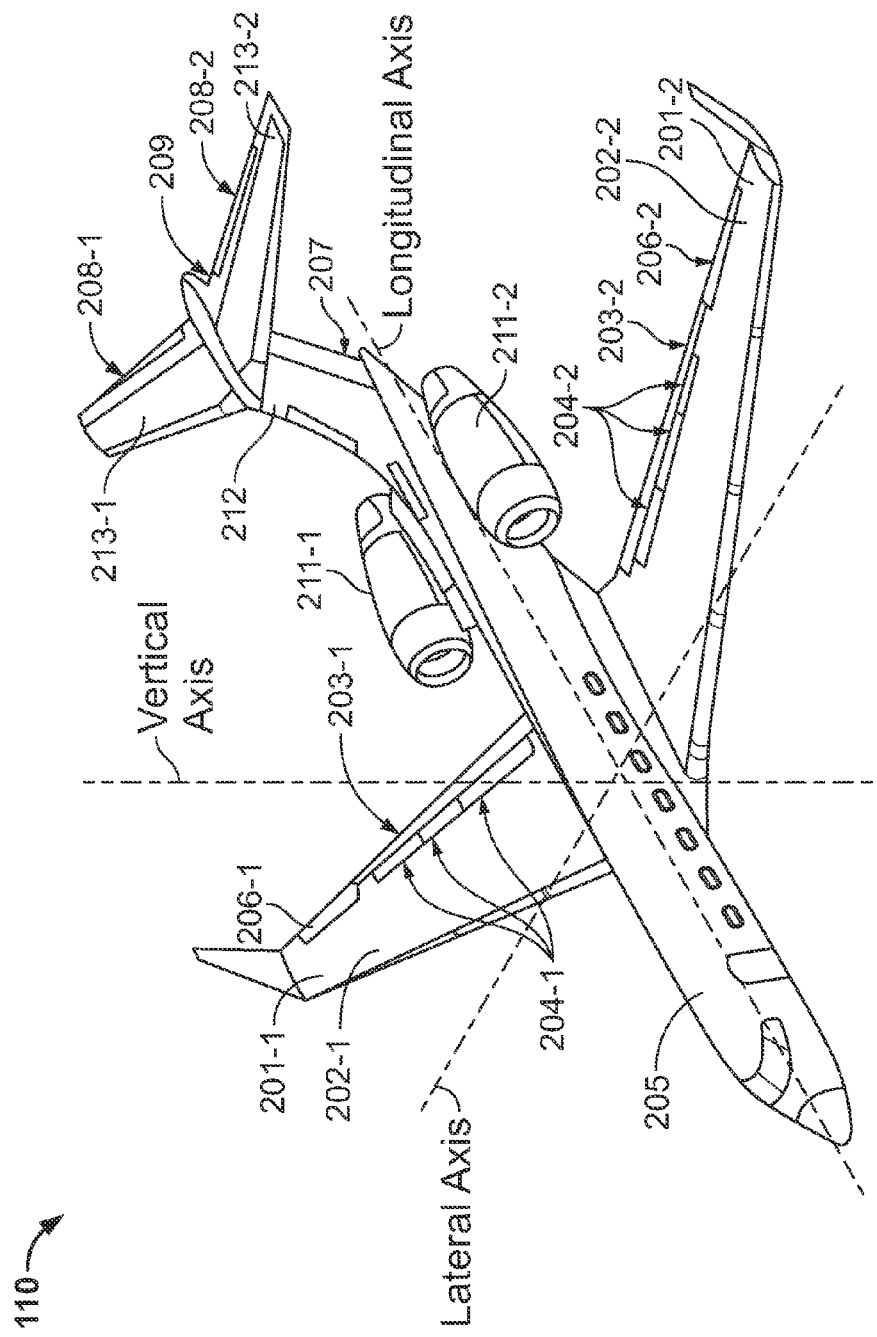
FIG. 2A is an exemplary perspective view of an aircraft that can be used in accordance with some of the disclosed embodiments.

FIG. 2A is a perspective view of an aircraft 110 that can be used in accordance with some of the disclosed embodiments. In accordance with one non-limiting implementation of the disclosed embodiments, the aircraft 110 includes a fuselage 205, two main wings 201-1, 201-2, a vertical stabilizer 212, an elevator 209 that includes two horizontal stabilizers 213-1 and 213-2 in a T-tail stabilizer configuration, and two jet engines 211-1, 211-2. For flight control, the two main wings 201-1, 201-2 each have an aileron 202-1, 202-2, an aileron trim tab 206-1, 206-2, a spoiler 204-1, 204-2 and a flap 203-1, 203-2, while the vertical stabilizer 212 includes a rudder 207, and the aircraft's horizontal stabilizers (or tail) 213-1, 213-2 each include an elevator trim tab 208-1, 208-2. Although not shown in FIG. 2A, the aircraft 110 also includes an onboard computer, aircraft instrumentation and various control systems and sub-systems as will now be described with reference to FIG. 2B.

Figure 2B:
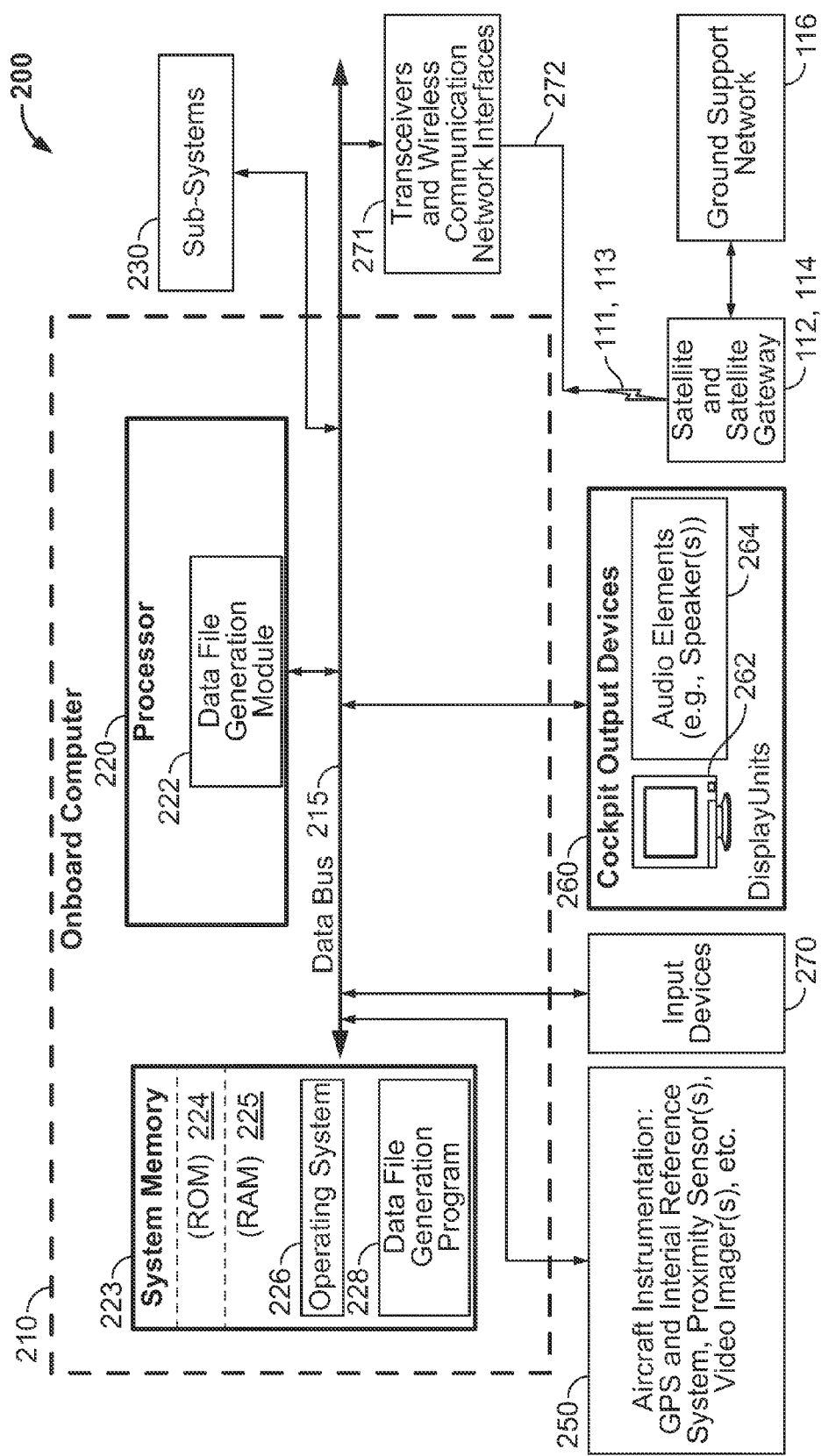
FIG. 2B is a functional block diagram of an Aircraft Health and Trend Monitoring (AHTM) system in accordance with an exemplary implementation of the disclosed embodiments.

FIG. 2B is a block diagram of an Aircraft Health and Trend Monitoring (AHTM) system 200 in accordance with an exemplary implementation of the disclosed embodiments. Part of the system 200 is implemented within an aircraft 110 for acquiring data. This data can include measured data for one or more relevant variables, measured data for relevant parameters associated with the one or more relevant variables, CAS messages and measured data for relevant parameters associated with the one or more CAS messages. This data can then be communicated from the aircraft 110 to the ground support network 116 and used for monitoring the health of one or more elements (e.g., sub-systems 230 or components of such sub-systems) of the aircraft 110, and/or for monitoring trending behavior exhibited by one ore more elements of the aircraft 110. As shown, the system 200 includes various sub-systems 230 of the aircraft 110.

The aircraft 110 portion of the system 200 includes an onboard computer 210, various sub-systems 230, aircraft instrumentation 250, cockpit output devices 260 (e.g., display units 262 such as control display units, multifunction displays (MFDs), etc., audio elements 264, such as speakers, etc.), and various input devices 270 such as a keypad which includes a cursor controlled device, and one or more touchscreen input devices which can be implemented as part of the display units.

The aircraft instrumentation 250 can include, for example, an airspeed data system, elements of a Global Position System (GPS), which provides GPS information regarding the position and/or speed of the aircraft, and elements of an Inertial Reference System (IRS), proximity sensors, switches, relays, video imagers, etc. In general, the IRS is a self-contained navigation system that includes inertial detectors, such as accelerometers, and rotation sensors (e.g., gyroscopes) to automatically and continuously calculate the aircraft's position, orientation, heading (direction) and velocity (speed of movement) without the need for external references once the IRS has been initialized.

The onboard computer 210 includes a data bus 215, a processor 220, system memory 223, and satellite communication transceivers and wireless communication network interfaces 271.

The data bus 215 serves to transmit programs, data, status and other information or signals between the various elements of FIG. 2B. The data bus 215 is used to carry information communicated between the processor 220, the system memory 223, the various sub-systems 230, aircraft instrumentation 250, cockpit output devices 260, various input devices 270, and the satellite communication transceivers and wireless communication network interfaces 271. The data bus 215 can be implemented using any suitable physical or logical means of connecting the on-board computer 210 to at least the external and internal elements mentioned above. This includes, but is not limited to, direct hard-wired connections, fiber optics, and infrared and wireless bus technologies.

The processor 220 performs the computation and control functions of the computer system 210, and may comprise any type of processor 220 or multiple processors 220, single integrated circuits such as a microprocessor, or any suitable number of integrated circuit devices and/or circuit boards working in cooperation to accomplish the functions of a processing unit.

It should be understood that the system memory 223 may be a single type of memory component, or it may be composed of many different types of memory components. The system memory 223 can includes non-volatile memory (such as ROM 224, flash memory, etc.), memory (such as RAM 225), or some combination of the two. The RAM 225 can be any type of suitable random access memory including the various types of dynamic random access memory (DRAM) such as SDRAM, the various types of static RAM (SRAM). The RAM 225 includes an operating system 226, and data file generation programs 228. The RAM 225 stores executable code for one or more data file generation programs 228. The data file generation programs 228 (stored in system memory 223) that can be loaded and executed at processor 220 to implement a data file generation module 222 at processor 220. As will be explained below, the processor 220 executes the data file generation programs 228 to generate data files that include measured parametric data that is used at the ground support network 116 and/or computer 122 to conducting health and trend monitoring for one or more aircraft sub-systems (or components thereof).

In addition, it is noted that in some embodiments, the system memory 223 and the processor 220 may be distributed across several different on-board computers that collectively comprise the on-board computer system 210.

The satellite communication transceivers and wireless communication network interfaces 271 are operatively and communicatively coupled to satellite antenna 272 that can be external to the on-board computer 210. The satellite antenna 272 that can be used to communicate information with the satellite 112 over a satellite communication links 111 and 113. The satellite gateway 114 can be coupled to other networks, including the Internet, so that information can be exchanged with remote computers.

Figure 2C:
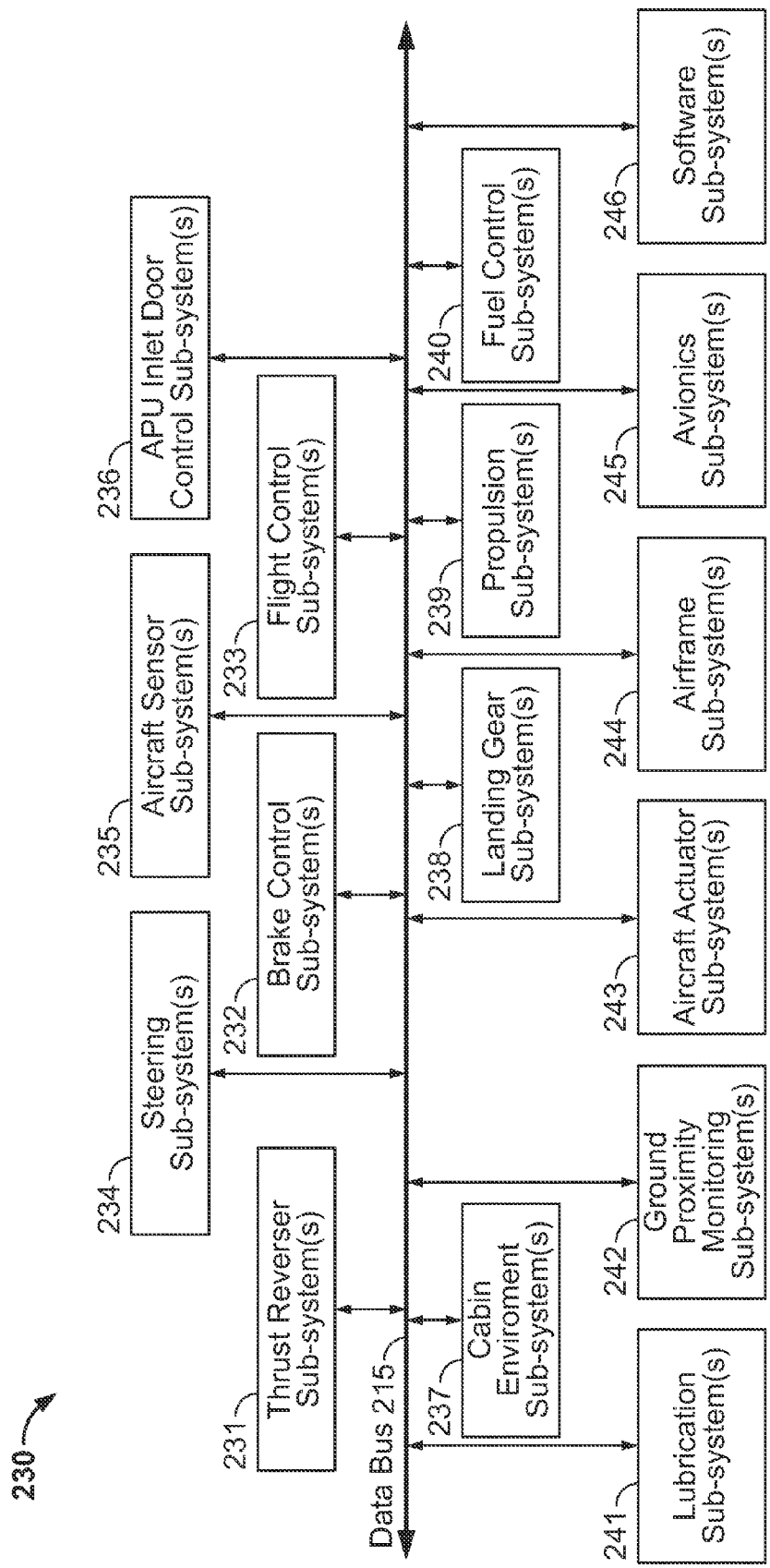
FIG. 2C is a block diagram of some of an aircraft's various sub-systems in accordance with an exemplary implementation of the disclosed embodiments.

FIG. 2C is a block diagram of various sub-systems 230 of an aircraft 110 in accordance with an exemplary implementation of the disclosed embodiments.

In one exemplary, non-limiting implementation, the various sub-system(s) 231-246 include a thrust reverser control sub-system(s) 231, a brake control sub-system(s) 232, a flight control sub-system(s) 233, a steering control sub-system(s) 234, aircraft sensor control sub-system(s) 235, an auxiliary power unit (APU) inlet door control sub-system(s) 236, a cabin environment control sub-system(s) 237, a landing gear control sub-system(s) 238, propulsion sub-system(s) 239, fuel control sub-system(s) 240, lubrication sub-system(s) 241, ground proximity monitoring sub-system(s) 242, aircraft actuator sub-system(s) 243, airframe sub-system(s) 244, avionics sub-system(s) 245, software sub-system(s) 246.

The sub-system(s) 231-246 that are illustrated in FIG. 2B are exemplary only, and in other embodiments various other sub-system(s) can be included such as, for example, air data sub-system(s), auto flight sub-system(s), engine/powerplant/ignition sub-system(s), electrical power sub-system(s), communications sub-system(s), fire protection sub-system(s), hydraulic power sub-system(s), ice and rain protection sub-system(s), navigation sub-system(s), oxygen sub-system(s), pneumatic sub-system(s), information sub-system(s), exhaust sub-system(s), etc.

Although not illustrated in FIG. 2C, those skilled in the art will appreciate that each of the various sub-systems can include one or more components. In addition, each of the various sub-systems can each include one or more sensors to facilitate measurement and generation of data pertaining to operation of that sub-system of the aircraft 110 (and/or a component of that sub-system), to assist in performing diagnostics and health monitoring of one or more sub-systems, etc. Each sensor can generate data that is used to generate information that can be included in the parameter files that are generated by the data file generation unit 222 of FIG. 2B.

In general, a "sensor" is a device that measures a physical quantity and converts it into a signal which can be read by an observer or by an instrument. In general, sensors can be used to sense light, motion, temperature, magnetic fields, gravitational forces, humidity, vibration, pressure, electrical fields, current, voltage, sound, and other physical aspects of an environment. Non-limiting examples of sensors can include acoustic sensors (e.g., sound, microphone, seismometer, accelerometer, etc.), vibration sensors, aircraft or other vehicle sensors (e.g., air speed indicator, altimeter, attitude indicator, gyroscope, inertial reference unit, magnetic compass, navigation instrument sensor, speed sensors, throttle position sensor, variable reluctance sensor, viscometer, wheel speed sensor, Yaw rate sensor, etc.), chemical sensors/detectors, electric current sensors, electric potential sensors, magnetic sensors, radio frequency sensors, environmental sensors, fluid flow sensors, position, angle, displacement, distance, speed, acceleration sensors (e.g., accelerometer, inclinometer, position sensor, rotary encoder, rotary/linear variable differential transformer, tachometer, etc.), optical, light, imaging sensors (e.g., charge-coupled device, infra-red sensor, LED, fiber optic sensors, photodiode, phototransistors, photoelectric sensor, etc.), pressure sensors and gauges, strain gauges, torque sensors, force sensors piezoelectric sensors, density sensors, level sensors, thermal, heat, temperature sensors (e.g., heat flux sensor, thermometer, resistance-based temperature detector, thermistor, thermocouple, etc.), proximity/presence sensors, etc.

Figure 3:
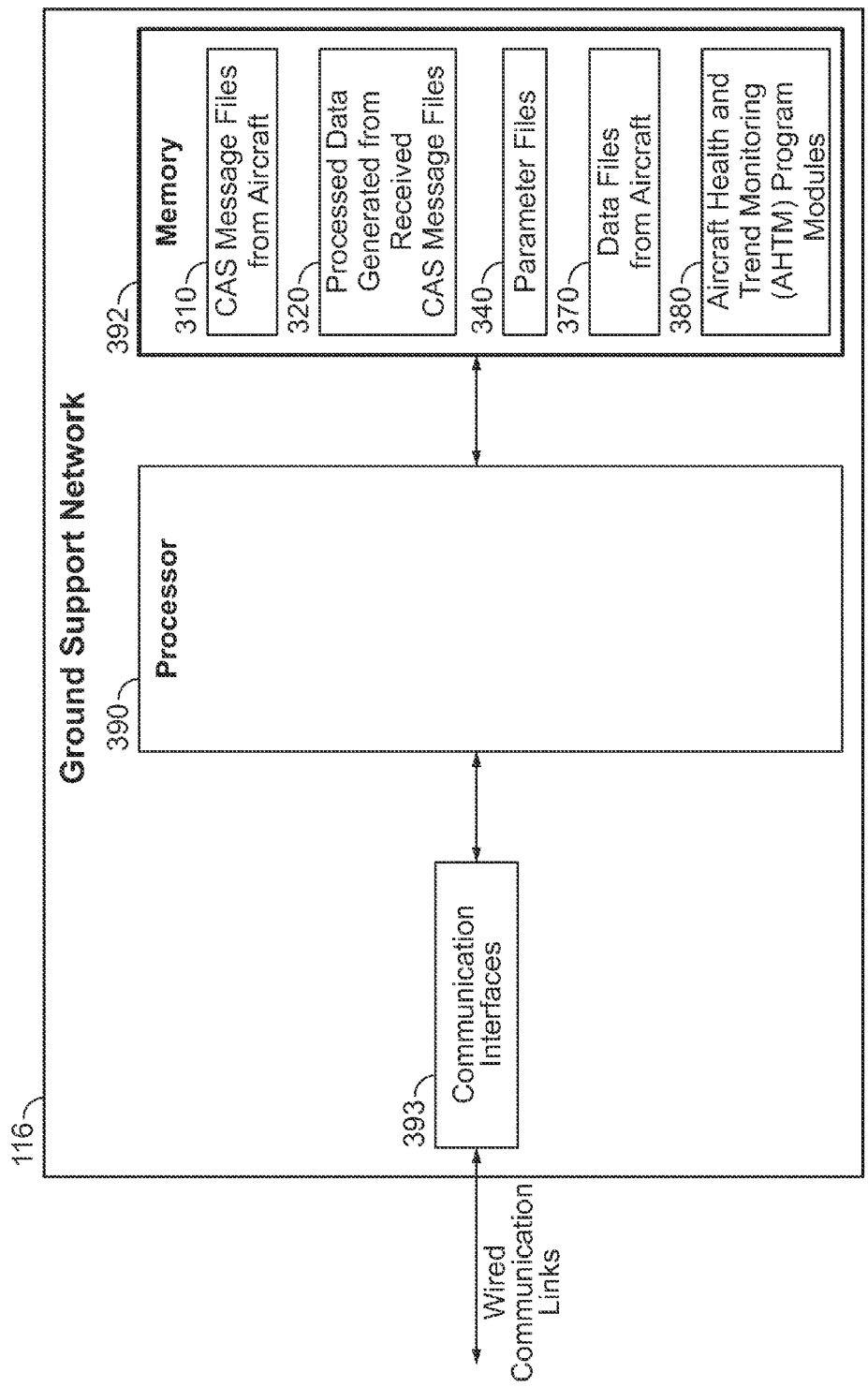
FIG. 3 is a block diagram of portions of a ground support network in accordance with one exemplary implementation of the disclosed embodiments.

FIG. 3 is a block diagram of portions of a ground support network (GSN) 116 in accordance with one exemplary implementation of the disclosed embodiments. As illustrated in FIG. 3, the ground support network 116 includes at least one processor 390 (e.g., implemented at one or more servers), memory 392 and communication interfaces 393 that are coupled to various different communication links. Although not illustrated, in some implementation, the GSN 116 can include multiple servers/processors. One such server/processor can be used for processing of inbound satellite communications and generation of outbound messages to be communicated via outbound satellite communications destined for the aircraft.

The memory 392 can be implemented using any of the memory technologies that are disclosed herein. The memory 392 stores a plurality of Aircraft Health and Trend Monitoring (AHTM) program modules 380 that can be loaded and executed at the processor 390. Each of the AHTM program modules 380 are programmed with computer executable instructions for implementing a particular health and trend monitoring algorithm (HTMA). The memory 392 can store various different AHTM program modules 380 that can be used to implement various different HTMAs via computer executable instructions. Various examples of AHTM program modules 380 and corresponding HTMAs will be described below.

The memory 392 can also store CAS message files 310 received from the aircraft 110, processed data 320 that is generated from the CAS message files 310 after being processed by the processor 390, parameter files 340 that are provided from the computer 122, and data files 370 that are received from the aircraft 110.

When CAS message files 310 and/or data files 370 are received at the ground support network 116 from the aircraft 110, CAS message files 310 and/or data files 370 can be loaded at the processor 390 along with a corresponding AHTM program module 380 that corresponds to that particular type of CAS message file 310 and/or data file 370. When the processor 390 executes the computer executable code of an AHTM program module 380 with respect to measured data included in the CAS message file 310 and/or data file 370, an instantiation of an Aircraft Health and Trend Monitoring (AHTM) processor is implemented at the processor 390.

Each parameter file 340 can include one or more relevant parameters that are selected or identified based on the CAS message file 310. Each of the data files 370 can include measured data corresponding to the relevant parameters specified in the parameter file. The relevant parameters included in one of the data files 370, as well as thresholds (e.g., upper and/or lower thresholds) for each of the relevant parameters, are configurable and can be pre-defined. As will be explained below, the measured data for each of the relevant parameters included in one of the data files 370 can be associated with the particular sub-system or component of the aircraft 110, and can be used at the ground support network 116 or the computer 122 to help analyze the performance or operational characteristics of that particular sub-system or component, and/or to isolate the specific cause(s) of an abnormality. For example, the AHTM program modules 380 and their corresponding HTMAs can examine measured data for relevant parameters (RPs) to determine which particular sub-system of an aircraft (or of a component of a particular sub-system) is most likely causing the abnormality that generated the CAS message. This way, those particular sub-system(s) (or components thereof) can be easily identified for further inspection to determine whether they are operating correctly or whether corrective actions need to be taken.

Figure 4:
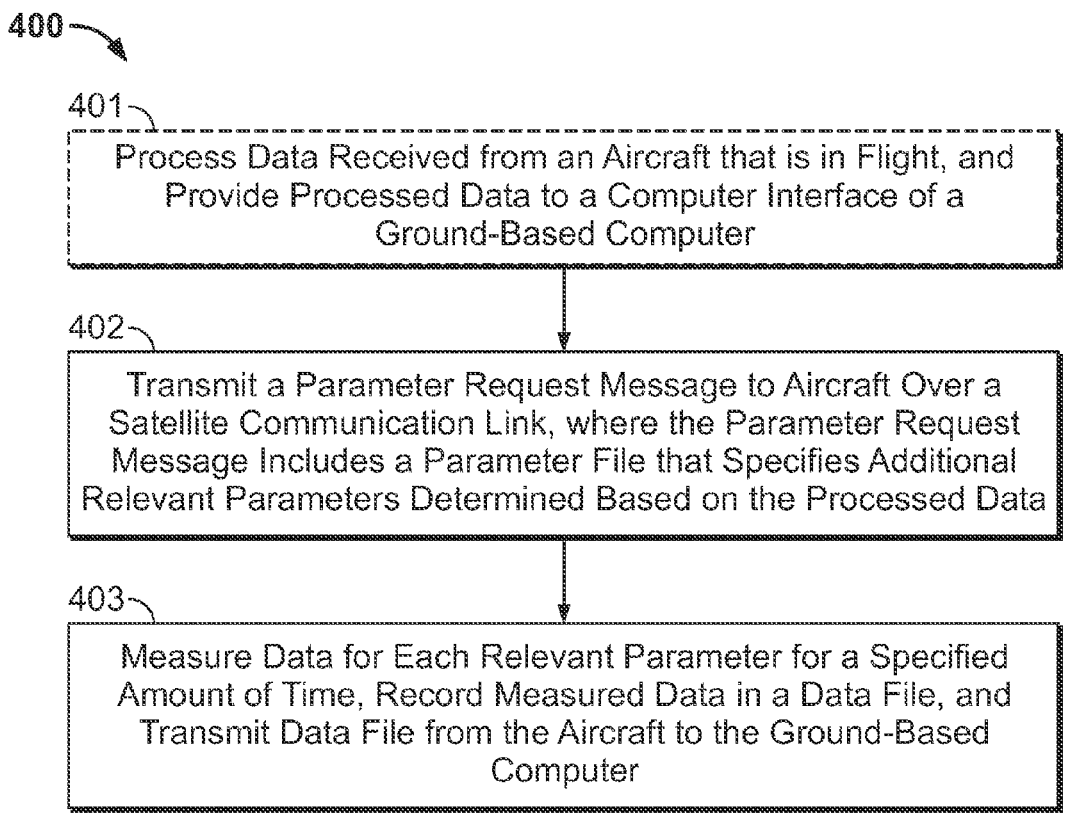
FIG. 4 is a flowchart of a method for requesting and retrieving aircraft data from an aircraft's various sub-systems during flight in accordance with one exemplary implementation of some of the disclosed embodiments.

FIG. 4 is a flowchart of a method 400 for requesting and retrieving aircraft data from an aircraft's various sub-systems during flight in accordance with one exemplary implementation of some of the disclosed embodiments.

Block 401 is optional and is therefore illustrated in dashed lines. At 401, in one exemplary and non-limiting embodiment, data received from an aircraft that is in flight is processed and the processed data is provided to a computer interface of a ground-based computer. Prior to 402, relevant parameters that are to be measured can be determined and/or specified at the ground-based computer or other computer (either automatically or by a human operator). In one implementation, these additional relevant parameters that are to be measured can be determined and/or specified at the ground-based computer or other computer based on or taking into account the processed data.

At 402, a parameter request message is transmitted to the aircraft over a satellite communication link. The parameter request message includes a parameter file that specifies additional relevant parameters that are to be measured and optionally specifies the duration for which each additional relevant parameter is to be measured.

At 403, aircraft data for each relevant parameter is measured for a specified amount of time and recorded in a data file that is transmitted from the aircraft 110 back to the ground-based computer, where it can be forwarded to a computer 122. Once the data file is received at the computer 122, it can be processed either automatically by software or manually to determine whether the measured data is within one or more threshold limits or is trending away from a normal value. In some embodiments, an abnormal condition is detected when the measured data is determined to be outside of the one or more threshold limits. Information comprising each of the particular relevant parameters that are determined to have measured data that is outside of the particular threshold associated with that particular relevant parameter can then be analyzed to determine what source(s) are causing the measured data to be outside one or more threshold limits.

Figure 5A:
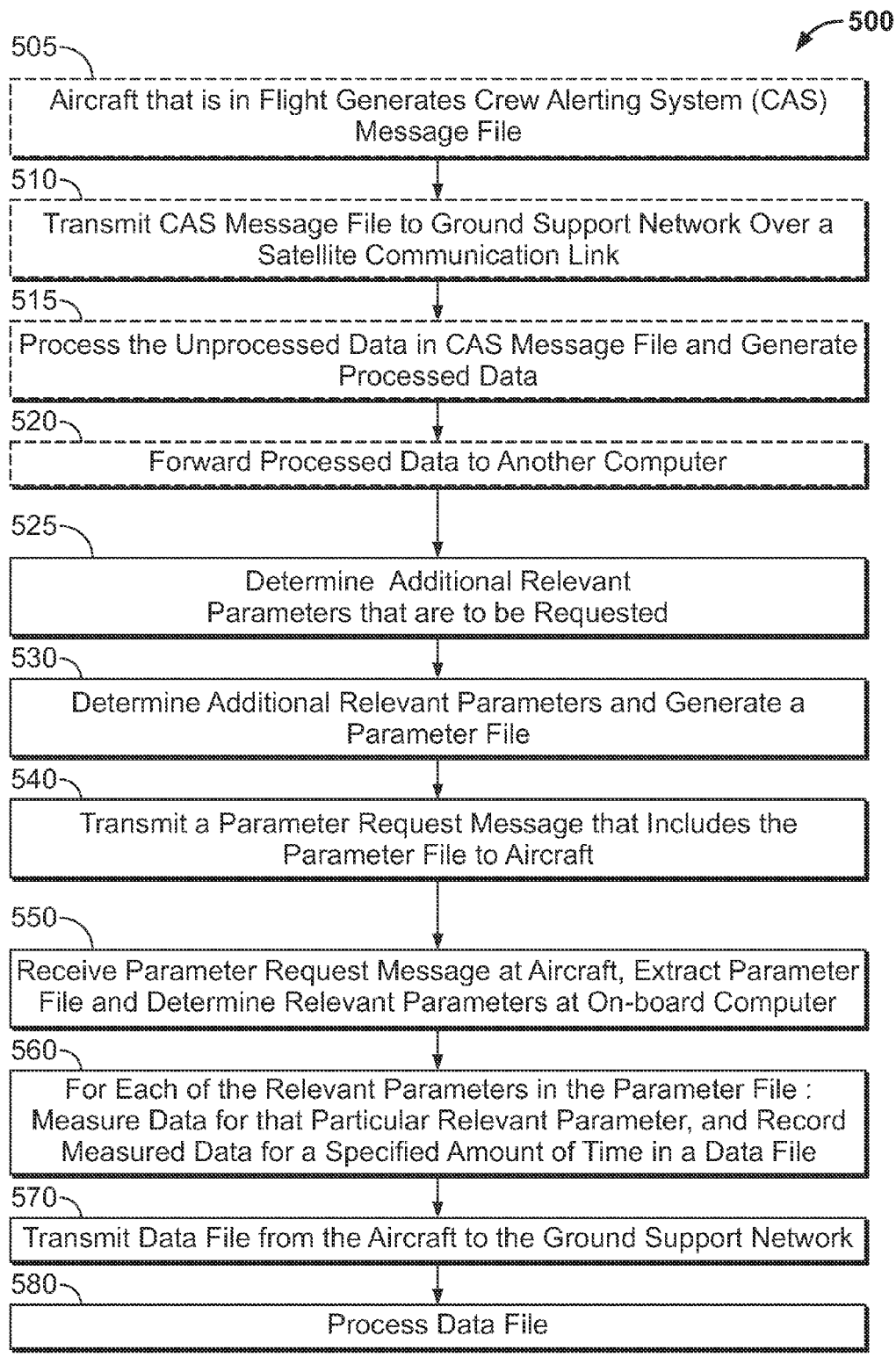
FIG. 5A is a flowchart of a method for requesting and retrieving aircraft data from an aircraft's various sub-systems during flight in accordance with one exemplary implementation of some of the disclosed embodiments.
Figure 5B:
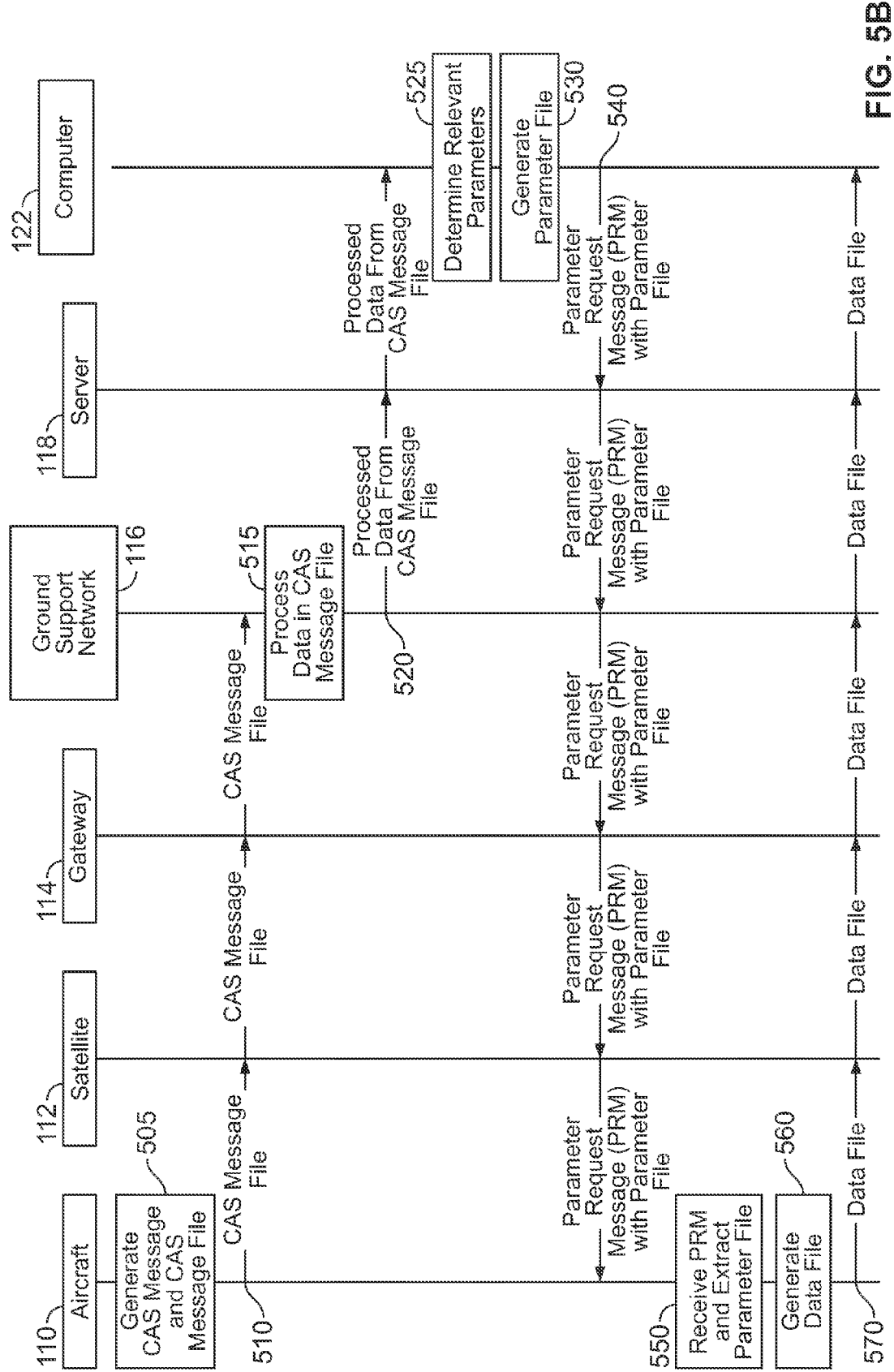
FIG. 5B is a flow diagram that shows some of the processing steps and communication of the various messages in accordance with one exemplary implementation of the method of FIG. 5A.

One exemplary implementation of method 400 will be described below with reference to FIGS. 5A and 5B. It is noted that in the non-limiting, exemplary implementation that is illustrated in FIGS. 5A and 5B, steps 505 through 520 are optional and illustrated to show one possible implementation in which the triggering event for determining relevant parameters and generating a parameter file is the receipt of a CAS message at the GSN 116. It should be appreciated that the trigger for step 525 is not limited to this specific example, and that other events can cause steps 525 through 540 to be performed. In this regard, it is noted that a wide variety of events could trigger events 525, 530 and 540 that are described below, and that the receipt of a CAS message (or processed data from a CAS message at computer 122 prior to event 525) is only one particular non-limiting example. A CAS message does not have to be the trigger to perform the data request. In some implementations, a trigger event is not even required. Data can be requested from the aircraft by a person at any time during the flight, with or without a CAS message annunciating. For example, an operator at computer 122 could randomly decide to determine relevant parameters and generate a parameter file for transmission to the aircraft.

FIG. 5A is a flowchart of a method for requesting and retrieving aircraft data from an aircraft's various sub-systems during flight in accordance with one exemplary implementation of some of the disclosed embodiments. FIG. 5B is a flow diagram of the method 500 of FIG. 5A that shows some of the processing steps and communication of the various messages in accordance with one exemplary implementation. FIG. 5B will be described below in conjunction with FIG. 5A, and the method 500 of FIGS. 5A and 5B will be described below with reference to FIGS. 1 through 3 to explain how the method 500 could be applied in the context of one exemplary, non-limiting environment and operational scenario.

As noted above, events at 505, 510, 515, 520 are optional and are therefore illustrated in dashed lines. In one particular non-limiting example, it is presumed that prior to the start of method 500, an aircraft 110 is in flight, and an on-board computer 220 of the aircraft 110 is in a monitoring state in which it monitors and waits to receive a crew alerting system (CAS) message. The CAS message triggers an announcement to the flight crew of the aircraft, and automatically indicates that a relevant parameter or variable is outside of its threshold (s). For example, in some implementations, certain logical bits, which indicate failures can be logically processed (e.g., are logically AND-ed and OR-ed) in the avionics software to define when a CAS message is annunciated in the aircraft cockpit. These bits, in general, indicate an abnormal condition. A CAS message necessarily indicates that a measured parameter or variable is outside one or more threshold limits (e.g., is above or below expected values), and thus indicates that an abnormal condition has been detected (e.g., detects/identifies/observes an abnormality in that sub-system).

At event 505, the on-board computer 220 of the aircraft 110 generates data intended for transmission to the GSN 116. In one implementation, this data can be a CAS message file. When the CAS message file is generated, unprocessed data for each one of a set of parameters that are associated with that particular CAS message are measured and recorded in a CAS message file corresponding to that CAS message. Each particular parameter can have a parameter name associated with it for easy identification. The data for each particular parameter is unprocessed or raw data. With respect to any CAS message, a data stream can be measured for the parameter(s) for a particular duration of time based on the initial trigger event (that caused the CAS message to be generated). The CAS message file is typically a small file that includes some relevant parameters measured over a relatively short duration of time.

Upon generating the CAS message file, at 510, the aircraft 110 performs operations to open a first satellite communication link 111 between the aircraft 110 and the satellite 112 and a second satellite communication link 113 between the satellite 112 and a ground-based gateway 114. Once set up, the aircraft 110 then transmits the CAS message over the satellite communication link 111 to a satellite 112. The satellite 112 then relays the CAS message file over another satellite communication link 113 to the gateway 114. In one exemplary embodiment, the gateway can be an Iridium ground station. The gateway 114 then forwards the CAS message file to the ground support network 116. The gateway 114 can then communicate the CAS message file to a ground-based computer of the ground support network 116. The ground support network 116 is typically implemented a third-party site.

In some implementations, the CAS messages can have different priorities. In one embodiment, only high priority CAS messages and their associated CAS message files (with parameters) are immediately sent (i.e., shortly after generation of the CAS message file) to the ground support network 116 via a satellite communication link 111 during flight of the aircraft 110 before the aircraft lands. As used herein, the term high priority refers to a CAS message it has priority greater than other types of CAS messages. In some embodiments, a system administrator can select which particular CAS messages are to be designated as high priority CAS messages. In other words, the list of CAS messages are high priority CAS messages can be configured, for example, by an operator, such as, an operator at the ground support network 116 or other computer 122; by a manufacturer of the aircraft, or any other entity. Lower priority CAS messages and their associated CAS message files can be transmitted to the ground support network 116 when the aircraft lands via, for example, a WLAN communication link or a cellular communication link.

At 515, a ground-based computer at the ground support network 116 processes the unprocessed data that was transmitted with the CAS message file from the aircraft 110 (while it is in flight) to generate the processed data from the CAS message file. For example, the ground support network 116 can receive the unprocessed data, uncompresses the unprocessed data from one format into another format that is readable and usable, and then process it for eventual use at the computer 122. As one example of the processing that can be performed, the ground support network 116 can determine whether the measured data for the parameters is within one or more threshold limits. The threshold limits can be, for example, state thresholds (e.g., binary 0 or binary 1); time thresholds (either being less than or more than a specific time), data thresholds of data (e.g., being less than or more than a specific value of data), parameter value thresholds, etc. It is noted that although data from the CAS message file can be processed at the GSN (event 515), in other implementations, data from the CAS message file can be processed at other computers including a computer on-board the aircraft prior to transmission of the CAS message file. In such an implementation, the CAS message file would include the processed data, in which cast the GSN 116 simply relays the processed data to server 118.

At 520 the processed data is communicated to a computer 122 that is coupled to the ground-based computer 117. In one implementation, the processed data is communicated from a ground-based computer of the ground support network 116 to a server 118 that serves as a portal to the ground support network 116. The server 118 then communicates the processed data to the computer 122. for display on a user interface.

In some embodiments, at event 520, the ground support network 116 can process the measured data for the parameters that were included in the CAS message file to determine/identify/isolate one or more underlying cause(s) of the abnormality or abnormal condition that may have been the cause of the CAS message. To do so, in one embodiment, each parameter can be analyzed to determine which parameters have measured values that lie outside their corresponding thresholds (i.e., are not within their expected values). When the measured data for that particular parameter is outside of one or more threshold limits (e.g., greater than or less than one ore more of the threshold limits), that parameter is logged along with an indication of the sub-system that it applies (for example, in an identification file). Further, in some implementations, a list of elements can be generated that need to be inspected for potential corrective actions to resolve the abnormality. For example, in one implementation, personnel can inspect the elements that are included in the inspection file to determine what corrective actions (if any) need to be taken to resolve the abnormality restore the elements that are the cause (or potential cause) of the abnormality (with respect to anticipated or normal operating conditions) before the abnormality becomes significant. In some embodiments, the information can be displayed on a display.

However, in some cases, the unprocessed data provided in the CAS message file and/or the processed data from the CAS message file will not be adequate, and it would be desirable to obtain other additional information to properly assess the source or situation that caused the CAS message to be generated. For example, in many cases, the measured data for the parameters in the CAS message file are not adequate to determine the source (e.g., particular sub-system(s) or component thereof) of the abnormality that caused the CAS message to be generated. Therefore it would be desirable to have a mechanism that would allow measured data for other relevant parameters to be requested. This can help ground crews determine (more precisely) what elements need to be inspected for potential corrective actions to resolve the abnormality before the abnormality becomes significant As such, in accordance with some of the disclosed embodiments, upon receiving the processed data from the CAS message file at computer 122, it can be determined (e.g., either automatically by software or by a human operator) whether or not additional data or information is needed from the aircraft 110 to properly assess the situation that caused the CAS message to be generated. In some embodiments, by analyzing unprocessed data and/or the processed data from the CAS message file, additional relevant parameters that are needed can be determined.

Therefore, at event 525, additional relevant parameters that are to be measured or generated at the aircraft are determined.

For example, in one implementation, the additional relevant parameters can be determined, either automatically by software or by a human operator, based on the unprocessed data and/or the processed data from the CAS message file). In other words, the unprocessed data and/or processed data can be analyzed to determine that additional parametric data is needed from the aircraft 110 to identify one or more sources that are causing an abnormal condition that caused the CAS message file to be generated, and the corresponding relevant parameters can then be determined. The analysis done to make this determination can be done either automatically by software that is implemented at the computer 122 or can be done by an operator who is viewing the unprocessed data and/or the processed data via the computer 122. In other words, the parameter file will not always be generated every time it is received at the computer 122. Rather, the parameter file will only be generated when it is determined (either automatically by computer software or by an operator), based on the unprocessed data and/or the processed data, that additional data or information is required from the aircraft to properly assess or evaluate the cause or source of the CAS message file. For example, when it is determined that additional data or information is needed from the aircraft 110, the relevant parameters corresponding to that additional data or information can be selected or identified (either automatically or manually) at event 525.

At 530, a parameter request message can be generated that includes a parameter file that specifies the relevant parameters that are to be measured and recorded at the aircraft to provide the additional parametric data, and optionally a duration value for each relevant parameter. Each relevant parameter can influence or affect data that is to be measured. Each duration value specifies how long parametric data for that particular relevant parameter are to be measured and recorded.

In some embodiments, the parameter file can be generated automatically by computer software that is implemented at a computer 122. In another embodiment, an operator at computer 122 manually generates the parameter file by selecting relevant parameters that are to be included in the parameter file. As will be explained below, the data for each of these relevant parameters will eventually be measured at the aircraft and sent back to the ground from the aircraft.

In one embodiment, the parameter request message is a relatively small message, such as a text message. The number of relevant parameters specified in the parameter file can be relatively large. For instance, in one embodiment, the parameter file can specify up to 50 different relevant parameters that data is to be measured and recorded for at the aircraft 110. In addition, the parameter file may also specify how long data for each of the relevant parameters are to be measured at the aircraft.

At event 540, the parameter request message can be transmitted to the aircraft 110. In one embodiment, the computer 122 communicates the parameter request message to the server 118, which then communicates it to a ground-based computer of a ground support network 116. The ground support network 116 then communicates the parameter request message to the gateway 114, which communicates the parameter request message via a satellite communication link 113 to the satellite 112. The satellite 112 then communicates the parameter request message to the aircraft 110 via another satellite communication link 111.

In accordance with some embodiments, the parameter request message can automatically be transmitted whenever it is generated. In accordance with some of the other disclosed embodiments, the decision as to whether or not transmit the parameter request message can be made by an operator or other personnel at the computer 122. When an operator at computer 122 decides that the parameter request message should be communicated back to the aircraft 110 to retrieve additional data, the operator sends via the computer interface of computer 122 a command to communicate the parameter request message to the server 118.

At event 550, an on-board computer at the aircraft 110 receives the parameter request message and extracts the parameter file from the parameter request message, and then determines requested relevant parameters specified in the parameter file (and optionally corresponding duration values that each of the requested relevant parameters should be measured and recorded for).

At event 560, an on-board computer at the aircraft 110 generates a data file. In one embodiment, the data file can be generated by measuring parametric data for relevant parameters (e.g., that is received over a data bus from various sensors or other on-board computers) for a corresponding duration value and then recording the measured parametric data in the data file at the on-board computer. In some implementations, data can be measured for a duration that is specified in the parameter file for that particular relevant parameter. In one embodiment, the measured parametric data for each of the relevant parameters comprises a data stream for that particular relevant parameter that is measured for a particular corresponding duration value.

In one embodiment, the on-board computer at the aircraft 110 automatically creates or generates the data file by recording measured data for each of the relevant parameters (specified in the parameter file) in a data file. The data that is measured can be provided to the on-board computer, for example, from various sensors or other on-board computers over a bus. In general, data for each of the relevant parameters can be measured for relatively longer duration in comparison to the duration that other data is measured, for example, when generating the CAS message files. For example, in one embodiment, the data for each relevant parameter can be recorded for time period between five and 120 seconds in duration. The size of the data file can be relatively large in comparison to the size of the parameter file. For instance, in one embodiment, the data file can be between 25 KB and 250 KB in size.

At event 570, the aircraft 110 communicates the data file to the computer 122. In the particular embodiment illustrated in FIG. 5B, the aircraft 110 communicates the data file over the first satellite communication link 113 to the satellite 112, the satellite 112 communicates the data file over the second satellite communication link 111 to the gateway 114, which then communicates the data file to the ground support network 116. The ground support network 116 communicates the data file to the server 118, and the server 118 communicates the data file to the other computer 122 for display on a computer interface.

Once the data file is received at the computer 122, at 580, the data file can be processed either automatically by software or manually. In some embodiments, it can be determined whether the measured data for each relevant parameter is within one or more threshold limits or is trending away from a normal value. In some embodiments, an abnormal condition is detected when the measured data for a relevant parameter is determined to be outside of the one or more threshold limits. Information comprising each of the particular relevant parameters that are determined to have measured data that is outside of the particular threshold associated with that particular relevant parameter can then be analyzed to determine what source(s) are causing the measured data to be outside one or more threshold limits.

Thus, method 500 can be used to detect/identify/observe an abnormality in an aircraft sub-system (or components thereof), and to isolate/identify the underlying cause(s) of that abnormality (e.g., pinpoint the source(s) that are causing the abnormal condition).

The flowchart that is illustrated in FIG. 5A is exemplary, and is simplified for sake of clarity. In some implementations, additional blocks/tasks/steps can be implemented even though they are not illustrated for sake of clarity. These additional blocks/tasks/steps may occur before or after or in parallel and/or concurrently with any of the blocks/tasks/steps that are illustrated in FIG. 5A. It is also noted that some of the blocks/tasks/steps illustrated in FIG. 5A may be optional and do not need to be included in every implementation of the disclosed embodiments. In some implementations, although not illustrated, the presence or absence of certain conditions may need to be confirmed prior to execution of a block/task/step or prior to completion of a block/task/step. In other words, a block/task/step may include one or more conditions that are to be satisfied before proceeding from that block/task/step to the next block/task/step of FIG. 5A. For example, in some cases, a timer, a counter or combination of both may execute and need to be satisfied before proceeding to the next block/task/step of the flowchart. As such, any block/task/step can be conditional on other blocks/tasks/steps that are not illustrated in FIG. 5A.

It is also noted that there is no order or temporal relationship implied by the flowcharts of FIG. 5A unless the order or temporal relationship is expressly stated or implied from the context of the language that describes the various blocks/tasks/steps of the flowchart. The order of the blocks/tasks/steps can be varied unless expressly stated or otherwise implied from other portions of text.

In addition, in some implementations, FIG. 5A may include additional feedback or feedforward loops that are not illustrated for sake of clarity. The absence of a feedback or a feedforward loop between two points of the flowchart does not necessarily mean a feedback or feedforward loop is not present between the two points. Likewise, some feedback or feedforward loops may be optional in certain implementations. Although FIG. 5A is illustrated as including a single iteration this does not necessarily imply that the flowchart does not execute for a certain number of iterations or continuously or until one or more conditions occur.

Examples of Relevant Parameters Associated with Some Aircraft Systems and Sub-Systems The systems and methods that are described above can be designed to acquire relevant parameters that can be used to analyze at least the various aircraft sub-systems (or components thereof) that are described above. Some specific non-limiting examples of relevant parameters will now be given for context.

Examples of relevant parameters can include date and time stamps, hydraulic pressures, valve positions, temperatures, quantities, rates, flap positions, altitude, altitude rate airspeed, acceleration, positional information (latitude and longitude), air temperature, total fuel, ice detection, landing gear, gear door position, aircraft weight, landing gear weight on wheels sensor, landing gear and flap handle position, and status parameters, availability or status of a particular communication link channel, main and backup battery charge, temperature, voltage, current, main and backup transformer rectifier unit voltage, load, frequency, external power voltage, load, frequency, auxiliary power unit voltage, load, frequency, transformer rectifier unit (TRU) voltage, load, integrated drive generator (IDG) frequency, load factors, voltage, APU door indicators, APU door actuators, APU speeds, fuel flow, valve positions, voltages, APU door position, turbine gas temperatures, vibrations, N1, N2 speeds, valve positions, oil pressures, temperatures, fuel flow, temperatures, pressure ratios, aileron and/or aileron trim tab movement, variables such as initial +, − movement of the aileron, initial +, − movement of the aileron trim tab, a position difference between the left and right aileron, a position difference between the left and right aileron trim tab, pilot input versus actual movement of the left or right aileron, and pilot input versus actual movement of the left or right aileron trim tab, roll angles, rudder and trim movement, initial +, − movement of the rudder, initial +, − movement of the trim, a position difference between the rudder pedal position and the actual rudder position, a position difference between pilot input versus actual movement of the aileron, a position difference between pilot input versus actual movement of the rudder, yaw angles, rudder pedal position, forces, rudder trim position, servo drum positions, trim positions, landing gear information parameters, flap positions, the time between commanding the flaps to a position and the flaps attaining that position, a position difference between the right flap position and the left flap, flap handle position, spoiler positions, speed brake handle position, initial +, − movement of the horizontal stabilizer position, thrust reverser position and the time it takes the thrust reverser to stow and deploy, engine data, fuel flow, thrust reverser positions, flight control surface position, servo clutch states, pilot, copilot column forces, servo drum positions, trim positions, landing gear position and other information parameters, flight control computer status bits, the elevator and/or elevator trim tab movement, variables such as initial +, − movement of the elevator, initial +, − movement of the elevator trim tab, a position difference between pilot input versus actual movement of the elevator trim tab, a position difference between pilot input versus actual movement of the elevator, pitch angles, a temperature difference between the temperature when the wing anti-ice system was turned off and a temperature when the wing anti-ice system was turned on, and motor torque and current (wing) or pressure (cowl) versus temperature, wing anti-ice temperature, motor currents, ice detection status, cowl anti-ice pressures, wing, cowl anti-ice on status, differences among the air data probes including angle of attack for all probes, angle of sideslip for all probes, static, total pressure for all probes, impact pressure, AOA Miscompare CAS message data, temperatures of Enhanced Vision System (EVS) sensors, video valid parameters, temperature sensor information, elapsed time for the camera and EVS processor, etc.

CONCLUSION

The disclosed methods and systems provide a mechanism for requesting an aircraft to measure additional parametric data from on-board aircraft systems, and for providing that measured parametric data to a ground-based support network and associated ground-based computers to aid in aircraft health and trend monitoring. The disclosed methods and systems can be used to request measurement of relevant parameter data for various aircraft components and sub-systems on-demand and in real time without flight crew intervention. By communicating the relevant parameter data from the aircraft to the ground systems, a more detailed analysis of the data acquired from the aircraft can be performed and corrective actions can be taken. The disclosed methods and systems can detect degradation of performance of an aircraft's various components and sub-systems and that can identify the specific source of a potential fault within particular components and sub-systems of the aircraft. The disclosed methods and systems can reduce the amount of time needed to identify and diagnose problems and perform routine troubleshooting and aircraft maintenance tasks. In-flight issues can be identified for ground-based crews as soon as they occur to facilitate the development and implementation of quick and efficient return-to-service when the aircraft lands. The precise source of technical issues on the aircraft can be identified much more rapidly, and the time spent in conducting aircraft maintenance tasks can be significantly reduced. In addition, potential problems with a particular sub-system can be identified before that sub-system fails.

Those of skill in the art would further appreciate that the various illustrative logical blocks/tasks/steps, modules, circuits, and algorithm steps described in connection with the embodiments disclosed herein may be implemented as electronic hardware, computer software, or combinations of both. Some of the embodiments and implementations are described above in terms of functional and/or logical block components (or modules) and various processing steps. However, it should be appreciated that such block components (or modules) may be realized by any number of hardware, software, and/or firmware components configured to perform the specified functions. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments described herein are merely exemplary implementations The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. The word "exemplary" is used exclusively herein to mean "serving as an example, instance, or illustration." Any embodiment described herein as "exemplary" is not necessarily to be construed as preferred or advantageous over other embodiments.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

What is claimed is:

1. A system, comprising:
   a gateway;
   an aircraft comprising a transceiver; a plurality of sub-systems, and an on-board computer being configured to generate a crew alerting system (CAS) message file comprising unprocessed data, wherein the CAS message file automatically indicates that measured parametric data from a sub-system of the aircraft is outside one or more threshold limits and that an abnormal condition has been detected;
   a satellite that is communicatively coupled to the aircraft and the gateway via satellite communication links;
   a ground support network comprising a ground-based computer configured to process the unprocessed data in the CAS message file to generate processed data; and
   a computer, coupled to the ground-based computer, that is configured to:
      determine, based on the processed data, relevant parameters that are to be measured and recorded at the aircraft to provide additional parametric data and a duration value for each relevant parameter, wherein each of the relevant parameters correspond to additional parametric data that is needed from the aircraft to identify one or more sources that are causing the abnormal condition and that caused the CAS message file to be generated, wherein each duration value specifies how long parametric data for that particular relevant parameter are to be measured and recorded; and
      generate a parameter request message that includes a parameter file that specifies the relevant parameters that are to be measured and recorded at the aircraft; and
      communicate the parameter request message to the gateway for transmission to the aircraft over satellite communication links;
   wherein the on-board computer is further configured to:
      after receiving the parameter request message, extract the parameter file from the parameter request message;
      determine the relevant parameters and the corresponding duration values for each of the relevant parameters from the parameter file;
      measure parametric data for each relevant parameter of the parameter file for a corresponding duration value, wherein the measured parametric data for each of the of relevant parameters comprises: a data stream for that particular relevant parameter that is measured for a particular corresponding duration value; and
      record the measured parametric data in a data file; and
   wherein the transceiver is further configured to transmit the data file to the satellite for delivery to the other computer.

2. A system according to claim 1, wherein the on-board computer is configured to open a communication path that includes a first satellite communication link between the aircraft and the satellite and a second satellite communication link between the satellite and a ground-based gateway, and to communicate the CAS message file from the aircraft over the first satellite communication link to the satellite while the aircraft is in flight.

3. A system according to claim 2,
   wherein the satellite is configured to communicate the CAS message file over the second satellite communication link to the gateway, and
   wherein the gateway is configured to communicate the CAS message file to a ground support network that includes the ground-based computer.

4. A system according to claim 3, wherein the ground-based computer of the ground support network is configured to communicate the processed data to a server that serves as a portal to the ground support network and communicates the processed data to the other computer.

5. A system according to claim 4, wherein the relevant parameters are determined based on analysis of the processed data, and wherein each relevant parameter influences or affects data that is to be measured by the aircraft.

6. A system according to claim 2, wherein the parameter request message is communicated to the aircraft over satellite communication links by communicating the parameter request message to a server, communicating the parameter request message from the server to the ground support network, communicating the parameter request message from the ground support network to the gateway, communicating the parameter request message from the gateway via the second satellite communication link to the satellite; and communicating the parameter request message to the aircraft via the first satellite communication link.

7. A system according to claim 2, wherein the transceiver is further configured to communicate the data file over the first satellite communication link to the satellite, wherein the satellite is configured to communicate the data file over the second satellite communication link to the gateway, wherein the gateway is configured to communicate the data file to the ground support network, wherein the ground support network is configured to communicate the data file to a server, and wherein the server is configured to communicate the data file to the other computer for display on a computer interface.

* * * * *